United States Patent
Nakagawa et al.

(10) Patent No.: US 6,979,716 B1
(45) Date of Patent: Dec. 27, 2005

(54) PROCESS FOR PRODUCING BRANCHED POLYMER AND POLYMER

(75) Inventors: Yoshiki Nakagawa, Kobe (JP); Shigeki Ono, Kobe (JP); Masayuki Fujita, Kobe (JP); Kenichi Kitano, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/719,580

(22) PCT Filed: Jun. 18, 1999

(86) PCT No.: PCT/JP99/03275

§ 371 (c)(1),
(2), (4) Date: Mar. 9, 2001

(87) PCT Pub. No.: WO99/65963

PCT Pub. Date: Dec. 23, 1999

(30) Foreign Application Priority Data

Jun. 19, 1998 (JP) .................................. 10/172960
Jun. 19, 1998 (JP) .................................. 10/172961

(51) Int. Cl.[7] ............................................. C08F 20/10
(52) U.S. Cl. .............. 526/318.44; 526/268; 526/269; 526/312; 526/317; 526/318.1; 525/135; 525/145; 525/147; 525/172
(58) Field of Search .......................... 525/301, 268, 525/269, 312, 172, 135, 145, 147; 526/172, 526/135, 145, 147, 301, 312, 268, 269

(56) References Cited

U.S. PATENT DOCUMENTS

| | | | |
|---|---|---|---|
| 5,254,632 A | | 10/1993 | Kerscher et al. |
| 5,483,003 A | * | 1/1996 | Siol et al. .................... 525/309 |
| 5,763,548 A | | 6/1998 | Matyjaszewski et al. ... 526/135 |
| 5,789,487 A | | 8/1998 | Matyjaszewski et al. ... 525/301 |
| 5,807,937 A | * | 9/1998 | Matyjaszewski et al. ... 526/135 |
| 5,852,129 A | * | 12/1998 | Kusakabe et al. ............ 522/27 |
| 6,274,688 B1 | * | 8/2001 | Nakagawa et al. ......... 526/328 |
| 6,423,787 B1 | * | 7/2002 | Kitano et al. ............ 525/330.6 |

FOREIGN PATENT DOCUMENTS

| | | | |
|---|---|---|---|
| EP | 0261 942 | * | 3/1988 |
| EP | 0 357 036 | | 3/1990 |
| EP | 0 522 376 A1 | | 1/1993 |
| EP | 0 789 036 A2 | | 8/1997 |
| EP | 0 816 385 | | 1/1998 |
| EP | 1 059 308 A1 | | 12/2000 |
| JP | 50-150793 | * | 12/1975 |
| WO | WO 96/30421 | | 10/1996 |
| WO | WO 97/18247 | | 5/1997 |
| WO | WO 98/01480 | | 1/1998 |
| WO | WO 98/40415 | | 9/1998 |

\* cited by examiner

Primary Examiner—Tatyana Zalukaeva
(74) Attorney, Agent, or Firm—Connolly, Bove, Lodge & Hutz, LLP

(57) ABSTRACT

This invention is related to a production method of a branched polymer
  which comprises polymerizing a macromonomer [I],
  said macromonomer [I] being a vinyl polymer obtainable by radical polymerization and terminally having one polymerizable carbon—carbon double bond-containing group per molecule. Furthermore, by producing the macromonomer by living radical polymerization, in particular atom transfer radical polymerization, it becomes possible to produce the above polymers or gels having well controlled side chain molecular weights.

22 Claims, No Drawings

PROCESS FOR PRODUCING BRANCHED POLYMER AND POLYMER

TECHNICAL FIELD

The present invention relates to a production method of a branched polymer by polymerizing a vinyl polymer-based macromonomer having a terminal polymerizable carbon—carbon double bond.

BACKGROUND ART

Side by side with block copolymers, graft copolymers having a comb-like structure have attracted considerable attention in the field of macromolecular materials for the reason that these polymers have characteristics of constituent segments, as can be seen with thermoplastic elastomers and shock resistant plastics, and at the same time can express unique functions based on their microscopic phase separation structure.

Graft polymers have long been used in modifying polymers. It is, however, only recently that polymers with a well controlled structure were successfully synthesized. The concept of "macromolecular monomers" was developed by Milkovich and his colleagues and, by copolymerizing such monomers, it is now possible to synthesize polymers having a well-defined comb-like structure.

On the other hand, stellar polymers have linear polymer arms radially extending from the core thereof are known to have various properties distinct from those of linear polymers.

Roughly classified, two methods are available for the synthesis of stellar polymers. One method comprises causing arm polymers to grow from a compound or polymer, which serves as a core, while the other comprises first preparing polymer arms and then joining them together to form a stellar structure. For joining arms together, there may be mentioned the technique comprising reacting a compound having a plurality of functional groups capable of reacting with the terminal functional groups of the arm polymers, the technique comprising adding a compound having a plurality of polymerizable groups after preparation of arms by polymerization, and the technique comprising polymerizing a polymer having a terminal polymerizable group (hereinafter referred to as "macromonomer"), among others.

Such stellar polymers are constituted of homopolymers and copolymers of various kinds, such as polystyrenes, poly(meth)acrylates, polydienes, polyethers, polyesters and polysiloxanes. For obtaining a controlled stellar structure, it is necessary, irrespective of method of production, for the polymerization to be controlled. Therefore, the anionic polymerization, living cationic polymerization or polycondensation technique is employed in most instances.

Contrary to those polymers obtainable by ionic polymerization or polycondensation, such as specifically mentioned above, those vinyl polymers which are obtainable by radical polymerization and have a stellar structure have scarcely been put to practical use. In particular, any method has not yet been successfully developed for causing chain extension or constructing a stellar structure through binding of macromonomer molecules. Generally, vinyl polymers have those characteristics which the above-mentioned polyether polymers, hydrocarbon polymers or polyester polymers cannot have, for example high weathering resistance and transparency and, therefore, those having an alkenyl group or a crosslinkable silyl group on a side chain thereof are utilized in high weathering resistance coating compositions, for instance.

While graft polymers and stellar polymers can be obtained by using macromonomers, it is not yet easy to synthesize the macromonomers. In particular, it is difficult to control the polymerization in preparing vinyl polymer macromonomers to be generally subjected to radical polymerization, hence few such macromonomers have been synthesized. It is not easy, because of side reactions, to control the polymerization of acrylic polymers, among others, and, therefore, it is difficult to produce macromonomers having a terminal polymerizable group.

Accordingly, it is an object of the invention to provide a production method of a branched polymer using vinyl polymer macromonomers prepared by radical polymerization.

SUMMARY OF THE INVENTION

The invention thus provides a production method of a branched polymer by polymerizing a macromonomer (I),
said macromonomer (I) being a vinyl polymer obtainable by radical polymerization and having one polymerizable carbon—carbon double bond-containing group at one molecular terminus thereof per molecule.

The polymerizable carbon—carbon double bond-containing group is preferably represented by the general formula (1):

—OC(O)C(R)=CH₂    (1)

wherein R represents a hydrogen atom or a monovalent organic group containing 1 to 20 carbon atoms and, more preferably, is a hydrogen atom or a methyl group.

The main chain of the macromonomer (I) is not particularly restricted but preferably is produced by living radical polymerization, more preferably by atom transfer radical polymerization. The atom transfer radical polymerization is preferably carried out using, as a catalyst, a transition metal complex whose central metal is an element of the group 7, 8, 9, 10 or 11 of the periodic table of the elements, more preferably a metal complex the metal of which is selected from the group consisting of copper, nickel, ruthenium and iron, in particular a copper complex.

The main chain of the macromonomer (I) is not restricted but preferably includes (meth)acrylic polymers and styrene type polymers, more preferably acrylic ester polymers.

The macromonomer (I) is not restricted but preferably those obtainable by substituting a compound having a radical-polymerizable carbon—carbon double bond for a terminal halogen group of a vinyl polymer, more preferably those obtainable by reacting a vinyl polymer having a terminal halogen group represented by the general formula (2):

—CR¹R²X    (2)

wherein R¹ and R² each represents a group attached to an ethylenically unsaturated group of a vinyl monomer and X represents a chlorine, bromine or iodine atom, with a compound represented by the general formula (3):

M⁺⁻OC(O)C(R)=CH₂    (3)

wherein R represents a hydrogen atom or a monovalent organic group containing 1 to 20 carbon atoms and M⁺ represents an alkali metal or a quaternary ammonium ion, for substitution for said compound.

Further, the macromonomer (I) is preferably obtainable by reacting a hydroxy-terminated vinyl polymer with a compound represented by the general formula (4):

$$XC(O)C(R)=CH_2 \quad (4)$$

wherein R represents a hydrogen atom or a monovalent organic group containing 1 to 20 carbon atoms and X represents a chlorine or bromine atom or a hydroxy group, or by reacting a hydroxy-terminated vinyl polymer with a diisocyanate compound and then reacting the residual isocyanato group with a compound represented by the general formula (5):

$$HO-R'-OC(O)(R)=CH_2 \quad (5)$$

wherein R represents a hydrogen atom or a monovalent organic group containing 1 to 20 carbon atoms and R' represents a divalent organic group containing 2 to 20 carbon atoms. Among them, the one obtainable by the terminal halogen substitution method mentioned above is preferred.

The number average molecular weight of the polymeric macromonomer (I) is not restricted but preferably is not less than 3,000, and the weight average molecular weight (Mw)-to-number average molecular weight (Mn) ratio (Mw/Mn) of the macromonomer (I) as determined by gel permeation chromatography is preferably less than 1.8.

The method of polymerizing the macromonomer (I) in accordance with the present invention is not restricted but preferably is radical polymerization, more preferably living radical polymerization, still more preferably atom transfer radical polymerization. The atom transfer radical polymerization is carried out using, as a catalyst, a transition metal complex the central metal of which is an element of the group 7, 8, 9, 10 or 11 of the periodic table of the elements, more preferably a metal complex the metal of which is selected from the group consisting of copper, nickel, ruthenium and iron, in particular a copper complex.

As the method of polymerizing the macromonomer (I) are preferably initiated by active radiation and the application of heat.

The polymerization of the macromonomer (I) may also be conducted in the manner of anionic polymerization.

Homopolymerization of the macromonomer (I) according to the present invention gives a stellar polymer, while copolymerization of the macromonomer (I) with a copolymerizable monomer (II) other than the macromonomer gives a graft copolymer. Further, copolymerization of the macromonomer (I) with a polyfunctional compound having two or more polymerizable carbon—carbon double bonds per molecule, preferably a polymer (III) having such double bonds at the molecular termini thereof, gives a crosslinked polymer (gel).

The present invention also covers a branched polymer obtainable by the method of the invention.

The polymers of the invention are not restricted in their applications but, for example, they are used as thermoplastic elastomers, impact resistance modifiers and adhesives.

DETAILED DESCRIPTION OF THE INVENTION

The present invention is directed to a production method of a branched polymer which comprises polymerizing a macromonomer (I), said macromonomer (I) being a vinyl polymer obtainable by radical polymerization and having one polymerizable carbon—carbon double bond-containing group at one molecular terminus thereof per molecule.

The polymerizable carbon—carbon double bond-containing group is preferably represented by the above general formula (1).

Referring to the general formula (1), a specific example of R is not particularly restricted as far as it is a monovalent organic group containing 1 to 20 carbon atoms, but includes substituted or unsubstituted hydrocarbon groups containing 1 to 20 carbon atoms, ether groups, acyl groups, carbon- and nitrogen-containing groups, carbon- and sulfur-containing groups, carbon- and oxygen-containing groups, more specifically, $-H$, $-CH_3$, $-CH_2CH_3$, $-(CH_2)_nCH_3$ (n being an integer of 2 to 19), $-C_6H_5$, $-CH_2OH$, $-CN$ and so forth. Preferred are $-H$ and $-CH_3$, however.

<Main Chain of the Macromonomer (I)>

Monomer

The monomer constituting the main chain of the macromonomer (I) according to the invention is not particularly restricted but includes various species. As examples, there may be mentioned (meth)acrylic acid, methyl(meth)acrylate, ethyl(meth)acrylate, n-propyl(meth)acrylate, isopropyl(meth)acrylate, n-butyl(meth)acrylate, isobutyl(meth)acrylate, tert-butyl(meth)acrylate, n-pentyl(meth)acrylate, n-hexyl(meth)acrylate, cyclohexyl(meth)acrylate, n-heptyl(meth)acrylate, n-octyl(meth)acrylate, 2-ethylhexyl(meth)acrylate, nonyl(meth)acrylate, decyl(meth)acrylate, dodecyl(meth)acrylate, phenyl(meth)acrylate, toluyl(meth)acrylate, benzyl(meth)acrylate, 2-methoxyethyl(meth)acrylate, 3-methoxybutyl(meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylate, γ-(methacryloyloxypropyl)trimethoxysilane, adducts of (meth)acrylic acid with ethylene oxide, trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth)acrylate, perfluoromethyl(meth)acrylate, diperfluoromethylmethyl(meth)acrylate, 2-perfluoromethyl-2-perfluoroethylmethyl(meth)acrylate, 2-perfluorohexylethyl(meth)acrylate, 2-perfluorodecylethyl(meth)acrylate, 2-perfluorohexadecylethyl(meth)acrylate and like (meth)acrylic monomers; styrene, vinyltoluene, α-methylstyrene, chlorostyrene, styrenesulfonic acid and salts thereof and like styrene type monomers; perfluoroethylene, perfluoropropylene, vinylidene fluoride and like fluorine-containing vinyl monomers; vinyltrimethoxysilane, vinyltriethoxysilane and like silicon-containing vinyl monomers; maleic anhydride, maleic acid, maleic acid monoalkyl esters and dialkyl esters; fumaric acid, fumaric acid monoalkyl esters and dialkyl esters; maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide and like maleimide monomers; acrylonitrile, methacrylonitrile and like nitrile group-containing vinyl monomers; acrylamide, methacrylamide and like amide group-containing vinyl monomers; vinyl acetate, vinyl propionate, vinyl pivalate, vinyl benzoate, vinyl cinnamate and like vinyl esters; ethylene, propylene and like alkenes; butadiene, isoprene and like conjugated dienes; vinyl chloride, vinylidene chloride, allyl chloride and allyl alcohol, among others. These may be used singly or a plurality of such monomers may be copolymerized. Among them, styrene type monomers and (meth)acrylic monomers are preferred from the standpoint of physical properties of products, among others. Acrylic ester monomers and methacrylic ester monomers are more preferred and butyl acrylate is still more preferred. In the practice of the invention, these preferred monomers may be copolymerized with some other monomer(s) and, in that case, the proportion of the preferred monomers is preferably 40% by weight.

The macromonomer (I) according to the invention has a molecular weight distribution, namely the ratio of weight average molecular weight to number average molecular weight as determined by gel permeation chromatography, of less than 1.8, preferably not more than 1.7, more preferably not more than 1.6, still more preferably not more than 1.5, in particular not more than 1.4 and most preferably not more than 1.3. In the practice of the invention, the GPC determination is generally carried out on a polystyrene column, among others, using chloroform or tetrahydrofuran, among others, as the mobile phase, and the molecular weight values are determined in terms of polystyrene equivalents, for instance. When the molecular weight distribution is narrower, the macromonomer has a lower viscosity and the branched polymer produced by the method of the invention has a better controlled structure.

The macromonomer (I) of the invention preferably has a number average molecular weight within the range of 500 to 100,000, more preferably 3,000 to 40,000. When the molecular weight is not more than 500, the characteristics intrinsic to the vinyl polymers are hardly expressed. When it is in excess of 100,000, polymer handling becomes difficult.

<Polymerization of the Main Chain of Macromonomer (I)>

The vinyl polymer constituting the main chain of the macromonomer (I) of the invention is produced by radical polymerization. The radical polymerization includes "ordinary radical polymerization" by which a monomer having a specific functional group and a vinyl monomer are simply copolymerized using an azo compound or a peroxide, for instance, as a polymerization initiator, and "controlled radical polymerization" by which a specific functional group can be introduced at such a controlled site as a terminus.

The "ordinary radical polymerization" is a simple and easy method but a monomer having a specific functional group can be introduced into a polymer only randomly by this method and, for obtaining a highly functionalized polymer, it is necessary to use this monomer having a specific functional group in a fairly large amount. If it is used only in a small amount, there arises a problem, namely the proportion of polymer molecules having no such specific functional group introduced therein increases. Another problem is that since free radical polymerization is involved there, only those polymers are obtained which have a broad molecular weight distribution and a high viscosity.

The "controlled radical polymerization" can be further classified into "chain transfer agent process" which is carried out using a chain transfer agent having a specific functional group to thereby give a vinyl polymer having the specific functional group terminally, and "living radical polymerization" which can give a polymer having a molecular weight approximately as designed since the growing polymer terminus can grow without undergoing a termination reaction and/or the like.

The "chain transfer agent process" can give highly functionalized polymers but requires a chain transfer agent having a specific functional group in considerably large amounts as compared with the initiator, hence raises economic problems, inclusive of treatment problems. Since it involves free radical polymerization, like the above-mentioned "ordinary radical polymerization", it has problems; for example, the molecular weight distribution is broad and high-viscosity polymers only can be obtained.

Unlike these polymerization methods, the "living radical polymerization" proceeds at a high rate of polymerization and, on the other hand, hardly undergoes termination reactions and gives a polymer with a narrow molecular weight distribution (an Mw/Mn value of about 1.1 to 1.5) in spite of its being a mode of that radical polymerization which is regarded as difficult to control because of the tendency toward occurrence of termination reactions due to radical-to-radical coupling and the like. It is also possible, in living radical polymerization, to arbitrarily control the molecular weight by adjusting the monomer/initiator charge ratio.

The "living radical polymerization" method thus can give a low viscosity polymer with a narrow molecular weight distribution and, in addition, makes it possible to introduce a specific functional group-containing monomer into the polymer mostly at the desired sites and, therefore, is more preferred as the method of producing the above specific functional group-containing vinyl polymer.

While the term "living polymerization", in its narrower sense, means polymerization in which molecular chains grow while the termini thereof always retain their activity, said term generally includes, within the meaning thereof, quasi-living polymerization in which terminally inactivated molecules and terminally active molecules grow in a state of equilibrium. The latter definition is applied to the practice of the invention.

Such "living radical polymerization" has recently been studied actively by various groups of researchers. As examples, there may be mentioned, among others, the use of a cobalt-porphyrin complex as described in the J. Am. Chem. Soc., 1994, vol. 116, pages 7943 ff, the use of a radical capping agent such as a nitroxide compound as described in Macromolecules, 1994, vol. 27, pages 7228 ff., and the technique of "atom transfer radical polymerization (ATRP)" which uses an organic halide or the like as the initiator and a transition metal complex as the catalyst.

Among the "living radical polymerization" techniques, the above-mentioned "atom transfer radical polymerization" technique, which uses an organic halide or halogenated sulfonyl compound or the like as the initiator and a transition metal complex as the catalyst for polymerizing vinyl monomers, has, in addition to the above-mentioned advantageous features of "living radical polymerization", the advantages in that it gives a polymer having a halogen or the like, which is relatively advantageous to functional group conversion, at main chain termini and that the degree of freedom is great in initiator and catalyst designing and, therefore, it is more preferred as the method of producing vinyl polymers having a specific functional group. This atom transfer radical polymerization is described, for example, by Matyjaszewski et al. in the J. Am. Chem. Soc., 1995, vol. 117, pages 5614 ff.; Macromolecules, 1995, vol. 28, pages 7901 ff.; Science, 1996, vol. 272, pages 866 ff.; WO 96/30421, WO 97/18247, WO 98/01480 and WO 98/40415 and by Sawamoto et al. in Macromolecules, 1995, vol. 28, pages 1721 ff; Japanese Kokai Publication Hei-09-208616 and Japanese Kokai Publication Hei-08-41117, among others.

In the practice of the invention, any of the above methods may be employed without any particular restriction. Basically, however, controlled radial polymerization is preferred and, from the ease of control viewpoint, living radical polymerization is more preferred and atom transfer radical polymerization is particularly preferred.

First, one of the controlled radical polymerization techniques, namely the technique of polymerization using a chain transfer agent is described. As regards the radical polymerization using a chain transfer agent (telomer), as the process for obtaining a vinyl polymer having a terminal structure suited for the practice of the invention, it is not particularly restricted but includes the following two processes.

Thus, there are available the process for producing halogen-terminated polymers using a halogenated hydrocarbon as the chain transfer agent, as disclosed in Japanese Kokai Publication Hei-04-132706, and the process for producing hydroxy-terminated polymers using a hydroxy-containing mercaptan or hydroxy-containing polysulfide as the chain transfer agent, as disclosed in Japanese Kokai Publication Sho-61-271306, Japanese Patent 2,594,402 and Japanese Kokai Publication Sho-54-47782.

The living radical polymerization is now described.

Among the techniques of such polymerization, the one which uses a radical capping agent such as a nitroxide compound is first described. In this polymerization technique, a stable nitroxy free radical (=N—O.) is generally used as a radical capping agent. Such compound is not restricted but is preferably a 2,2,6,6-tetrasubstituted-1-piperidinyloxy radical, a 2,2,5,5-tetrasubstituted-1-pyrrolidinyloxy radical or a cyclic hydroxyamine-derived nitroxy free radical. Preferred as the substituents are alkyl groups containing not more than four carbon atoms, such as methyl or ethyl. As specific nitroxy free radical compounds, they are not restricted but include 2,2,6,6-tetramethyl-1-piperidinyloxy radical (TEMPO), 2,2,6,6-tetraethyl-1-piperidinyloxy radical, 2,2,6,6-tetramethyl-4-oxo-1-piperidinyloxy radical, 2,2,5,5-tetramethyl-1-pyrrolidinyloxy radical, 1,1,3,3-tetramethyl-2-isoindolinyloxy radical and N,N-di-tert-butylamine-oxy radical, among others. Such a stable free radical as galvinoxyl free radical may be used in lieu of the nitroxy free radical.

The above radical capping agent is used in combination with a radical generator. It is supposed that the reaction product from the radical capping agent and radical generator serve as a polymerization initiator to thereby cause the polymerization of an addition-polymerizable monomer(s) to proceed. The quantity ratio between both is not particularly restricted but the radical initiator is judiciously used in an amount of 0.1 to 10 moles per mole of the radical capping agent.

While various compounds can be used as the radical generator, a peroxide capable of generating a radical under polymerization temperature conditions is preferred. Such peroxide is not restricted but includes, among others, diacyl peroxides such as benzoyl peroxide and lauroyl peroxide; dialkyl peroxides such as dicumyl peroxides and di-tert-butyl peroxide; peroxycarbonates such as diisopropyl peroxydicarbonate and bis(4-tert-butylcyclohexyl) peroxydicarboante; and alkyl peresters such as tert-butyl peroxyoctanoate and tert-butylperoxybenzoate. In particular, benzoyl peroxide is preferred. Further, such a radical generator as a radical generating azo compound, for example azobisisobutyronitrile, may also be used in lieu of the peroxide.

As reported in Macromolecules, 1995, vol. 28, pages 2993 ff., alkoxyamine compounds such as illustrated below may be used in lieu of the combined use of a radical capping agent and a radical generator:

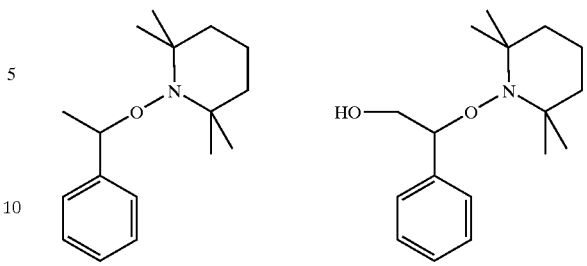

When an alkoxyamine compound is used as the initiator and when the alkoxyamine compound is a hydroxy- or like functional group-containing one such as illustrated above, polymers terminally having a hydroxy or like functional group are obtained. When this is applied to the present invention, functional group-terminated polymers are obtained.

The polymerization conditions, such as the monomer, solvent, polymerization temperature, etc., to be used in carrying out the polymerization using the above nitroxide compound or like radical capping agent are not restricted but may be the same as those to be used in the atom transfer radical polymerization to be described below.

The technique of atom transfer radical polymerization, which is preferred as the method of living radical polymerization of the invention, is described in the following.

In this atom transfer radical polymerization, an organic halide, in particular an organic halide having a highly reactive carbon-halogen bond (e.g. a carbonyl compound having a halogen in the α-position or a compound having a halogen at the benzyl site), or a halogenated sulfonyl compound is used as the initiator.

Specific examples are, among others:

$C_6H_5$—$CH_2X$, $C_6H_5$—$C(H)(X)CH_3$, $C_6H_5$—$C(X)(CH_3)_2$ (in the above chemical formulas, $C_6H_5$ is a phenyl group and X is chlorine, bromine or iodine);

$R^3$—$C(H)(X)$—$CO_2R^4$, $R^3$—$C(CH_3)(X)$—$CO_2R^4$, $R^3$—$C(H)(X)$—$C(O)R^4$, $R^3$—$C(CH_3)(X)$—$C(O)R^4$, (in which $R^3$ and $R^4$ each is a hydrogen atom or an alkyl group containing 1 to 20 carbon atoms, an aryl group containing 6 to 20 carbon atoms or an aralkyl group containing 7 to 20 carbon atoms and X is chlorine, bromine or iodine); and $R^3$—$C_6H_4$—$SO_2X$ (in which $R^3$ is a hydrogen atom or an alkyl group containing 1 to 20 carbon atoms, an aryl group containing 6 to 20 carbon atoms or an aralkyl group containing 7 to 20 carbon atoms and X is chlorine, bromine or iodine).

It is also possible to use, as the initiator in atom transfer radical polymerization, an organic halide or halogenated sulfonyl compound having a functional group other than the functional group for initiating the polymerization. In such a case, vinyl polymers having the functional group at one main chain terminus and a structure represented by the above general formula (2) at the other main chain terminus are produced. As such functional group, there may be mentioned alkenyl, crosslinking silyl, hydroxy, epoxy, amino and amide groups, among others.

The alkenyl-containing organic halide is not restricted but may be one having the structure shown by the general formula (6), for instance:

$$R^6R^7C(X)-R^8-R^9-C(R^5)=CH_2 \quad (6)$$

wherein $R^5$ is a hydrogen atom or a methyl group, $R^6$ and $R^7$ each is a hydrogen atom or an alkyl group containing 1 to 20 carbon atoms, an aryl group containing 6 to 20 carbon atoms or an aralkyl group containing 7 to 20 carbon atoms and $R^6$ and $R^7$ may be bound to each other at respective other termini, $R^8$ is —C(O)O— (ester group), —C(O)— (keto group) or an o-, m- or p-phenylene group, $R^9$ is a direct bond or a divalent organic group containing 1 to 20 carbon atoms, which may optionally contain one or more ether bonds, and X is chlorine, bromine or iodine.

As specific examples of the substituents $R^6$ and $R^7$, which are not particularly restricted, there may be mentioned hydrogen, methyl, ethyl, n-propyl, isopropyl, butyl, pentyl, hexyl, etc. $R^6$ and $R^7$ may be bound to each other at respective other termini to form a cyclic skeleton.

As specific examples of the alkenyl-containing organic halide represented by the general formula (6), there may be mentioned the following:

$XCH_2C(O)O(CH_2)_nCH=CH_2$, $H_3CC(H)(X)C(O)O(CH_2)_nCH=CH_2$, $(H_3C)_2C(X)C(O)O(CH_2)_nCH=CH_2$, $CH_3CH_2C(H)(X)C(O)O(CH_2)_nCH=CH_2$,

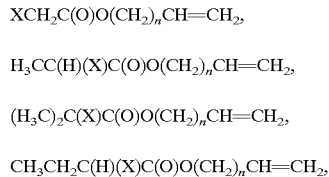

(in the above formulas, X is chlorine, bromine or iodine and n is an integer of 0 to 20);

$XCH_2C(O)O(CH_2)_nO(CH_2)_mCH=CH_2$, $H_3CC(H)(X)C(O)O(CH_2)_nO(CH_2)_mCH=CH_2$, $(H_3C)_2C(X)C(O)O(CH_2)_nO(CH_2)_mCH=CH_2$, $CH_3CH_2C(H)(X)C(O)O(CH_2)_nO(CH_2)_mCH=CH_2$,

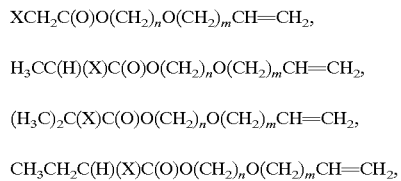

(in the above formulas, X is chlorine, bromine or iodine, n is an integer of 1 to 20 and m is an integer of 0 to 20);

o, m, p—$XCH_2$—$C_6H_4$—$(CH_2)_n$—CH=$CH_2$, o, m, p—$CH_3C(H)(X)$—$C_6H_4$—$(CH_2)_n$—CH=$CH_2$, o, m, p—$CH_3CH_2C(H)(X)$—$C_6H_4$—$(CH_2)_n$—CH=$CH_2$, (in the above formulas, X is chlorine, bromine or iodine and n is an integer of 1 to 20);

o, m, p—$XCH_2$—$C_6H_4$—$(CH_2)_n$—O—$(CH_2)_m$—CH=$CH_2$, o, m, p—$CH_3C(H)(X)$—$C_6H_4$—$(CH_2)_n$—O—$(CH_2)_m$—CH=$CH_2$, o, m, p—$CH_3CH_2C(H)(X)$—$C_6H_4$—$(CH_2)_n$—O—$(CH_2)_m$—CH=$CH_2$, (in the above formulas, X is chlorine, bromine or iodine, n is an integer of 1 to 20 and m is an integer of 0 to 20);

o, m, p—$XCH_2$—$C_6H_4$—O—$(CH_2)_n$—CH=$CH_2$, o, m, p-$CH_3C(H)(X)$—$C_6H_4$—O—$(CH_2)_n$—CH=$CH_2$, o, m, p-$CH_3CH_2C(H)(X)$—$C_6H_4$—O—$(CH_2)_n$—CH=$CH_2$, (in the above formulas, X is chlorine, bromine or iodine and n is an integer of 1 to 20);

o, m, p—$XCH_2$—$C_6H_4$—O—$(CH_2)_n$—O—$(CH_2)_m$—CH=$CH_2$, o, m, p—$CH_3C(H)(X)$—$C_6H_4$—O—$(CH_2)_n$—O—$(CH_2)_m$—CH=$CH_2$, o, m, p—$CH_3CH_2C(H)(X)$—$C_6H_4$—O—$(CH_2)_n$—O—$(CH_2)_m$—CH=$CH_2$, (in the above formulas, X is chlorine, bromine or iodine, n is an integer of 1 to 20 and m is an integer of 0 to 20).

As the alkenyl-containing organic halide, there may further be mentioned compounds represented by the general formula (7):

$$H_2C=C(R^5)-R^9-C(R^6)(X)-R^{10}-R^7 \quad (7)$$

wherein $R^5$, $R^6$, $R^7$, $R^9$ and X are as defined above and $R^{10}$ is a direct bond, —C(O)O— (ester group), —C(O)— (keto group) or an o-, m- or p-phenylene group.

$R^8$ is a direct bond or a divalent organic group containing 1 to 20 carbon atoms (which may optionally contain one or more ether bonds) and, when it is a direct bond, the vinyl group is bound to the carbon to which the halogen is bound, to form an allyl halide. In this case, the carbon-halogen bond is activated by the neighboring vinyl group, so that it is not always necessary for $R^{10}$ to be a C(O)O group or a phenylene group, for instance, but it may be a direct bond. When $R^9$ is not a direct bond, $R^{10}$ is preferably a C(O)O group, C(O) group or phenylene group so that the carbon-halogen bond may be activated.

Specific examples of the compound of the general formula (7) are, among others, the following:

$CH_2=CHCH_2X$, $CH_2=C(CH_3)CH_2X$, $CH_2=CHC(H)(X)CH_3$, $CH_2=C(CH_3)C(H)(X)CH_3$, $CH_2=CHC(X)(CH_3)_2$, $CH_2=CHC(H)(X)C_2H_5$, $CH_2=CHC(H)(X)CH(CH_3)_2$, $CH_2=CHC(H)(X)C_6H_5$, $CH_2=CHC(H)(X)CH_2C_6H_5$, $CH_2=CHCH_2C(H)(X)-CO_2R$, $CH_2=CH(CH_2)_2C(H)(X)-CO_2R$, $CH_2=CH(CH_2)_3C(H)(X)-CO_2R$, $CH_2=CH(CH_2)_8C(H)(X)-CO_2R$, $CH_2=CHCH_2C(H)(X)-C_6H_5$, $CH_2=CH(CH_2)_2C(H)(X)-C_6H_5$, $CH_2=CH(CH_2)_3C(H)(X)-C_6H_5$, (in the above formulas, X is chlorine, bromine or iodine and R is an alkyl group containing 1 to 20 carbon atoms, aryl group or aralkyl group).

Specific examples of the alkenyl-containing halogenated sulfonyl compound are as follows:

o, m, p—$CH_2=CH-(CH_2)_n-C_6H_4-SO_2X$ and o, m, p—$CH_2=CH-(CH_2)_n-O-C_6H_4-SO_2X$, wherein, in each formula, X is chlorine, bromine or iodine and n is an integer of 0 to 20.

The above-mentioned crosslinking silyl-containing organic halide is not particularly restricted but includes, among others, those having a structure shown by the general formula (8):

$$R^6R^7C(X)-R^8-R^9-C(H)(R^5)CH_2-[Si(R^{11})_{2-b}(Y)_bO]_m-S(R^{12})_{3-a}(Y)_a \qquad (8)$$

wherein $R^5$, $R^6$, $R^7$, $R^8$, $R^9$ and X are as defined above, $R^{11}$ and $R_{12}$ each represents an alkyl group containing 1 to 20 carbon atoms, an aryl group containing 6 to 20 carbon atoms or an aralkyl group containing 7 to 20 carbon atoms or a triorganosiloxy group of the formula $(R')_3SiO-$ (in which R' is a monovalent hydrocarbon group containing 1 to 20 carbon atoms, and the three R' groups may be the same or different) and, when there are two or more $R^{11}$ or $R^{12}$ groups, they may be the same or different, Y represents a hydroxy group or a hydrolyzable group and, when there are two or more Y groups, they may be the same or different, a represents 0, 1, 2 or 3, b represents 0, 1 or 2 and m is an integer of 0 to 19, provided that the relation a+mb≧1 should be satisfied. Specific examples of the compound of the general formula (8) are as follows:

$XCH_2C(O)O(CH_2)_nSi(OCH_3)_3$, $CH_3C(H)(X)C(O)O(CH_2)_nSi(OCH_3)_3$, $(CH_3)_2C(X)C(O)O(CH_2)_nSi(OCH_3)_3$, $XCH_2C(O)O(CH_2)_nSi(CH_3)(OCH_3)_2$, $CH_3C(H)(X)C(O)O(CH_2)_nSi(CH_3)(OCH_3)_2$, $(CH_3)_2C(X)C(O)O(CH_2)_nSi(CH_3)(OCH_3)_2$, (in the above formulas, X is chlorine, bromine or iodine and n is an integer of 0 to 20);

$XCH_2C(O)O(CH_2)_nO(CH_2)_mSi(OCH_3)_3$, $H_3CC(H)(X)C(O)O(CH_2)_nO(CH_2)_mSi(OCH_3)_3$, $(H_3C)_2C(X)C(O)O(CH_2)_nO(CH_2)_mSi(OCH_3)_3$, $CH_3CH_2C(H)(X)C(O)O(CH_2)_nO(CH_2)_mSi(OCH_3)_3$, $XCH_2C(O)O(CH_2)_nO(CH_2)_mSi(CH_3)(OCH_3)_2$, $H_3CC(H)(X)C(O)O(CH_2)_nO(CH_2)_mSi(CH_3)(OCH_3)_2$, $(H_3C)_2C(X)C(O)O(CH_2)_nO(CH_2)_mSi(CH_3)(OCH_3)_2$, $CH_3CH_2C(H)(X)C(O)O(CH_2)_nO(CH_2)_mSi(CH_3)(OCH_3)_2$, (in the above formulas, X is chlorine, bromine or iodine, n is an integer of 1 to 20 and m is an integer of 0 to 20);

o, m, p—$XCH_2-C_6H_4-(CH_2)_2Si(OCH_3)_3$, o, m, p—$CH_3C(H)(X)-C_6H_4-(CH_2)_2Si(OCH_3)_3$, o, m, p—$CH_3CH_2C(H)(X)-C_6H_4-(CH_2)_2Si(OCH_3)_3$, o, m, p—$XCH_2-C_6H_4-(CH_2)_3Si(OCH_3)_3$, o, m, p—$CH_3C(H)(X)-C_6H_4-(CH_2)_3Si(OCH_3)_3$, o, m, p—$CH_3CH_2C(H)(X)-C_6H_4-(CH_2)_3Si(OCH_3)_3$, o, m, p—$XCH_2-C_6H_4-(CH_2)_2-O-(CH_2)_3Si(OCH_3)_3$, o, m, p—$CH_3C(H)(X)-C_6H_4-(CH_2)_2-O-(CH_2)_3Si(OCH_3)_3$, o, m, p—$CH_3CH_2C(H)(X)-C_6H_4-(CH_2)_2-O-(CH_2)_3Si(OCH_3)_3$, o, m, p—$XCH_2-C_6H_4-O-(CH_2)_3Si(OCH_3)_3$, o, m, p-$CH_3C(H)(X)-C_6H_4-O-(CH_2)_3Si(OCH_3)_3$, o, m, p-$CH_3CH_2C(H)(X)-C_6H_4-O-(CH_2)_3Si(OCH_3)_3$, o, m, p—$XCH_2-C_6H_4-O-(CH_2)_2-O-(CH_2)_3Si(OCH_3)_3$, o, m, p-$CH_3C(H)(X)C_6H_4-O-(CH_2)_2-O-(CH_2)_3Si(OCH_3)_3$, o, m, p—$CH_3CH_2C(H)(X)-C_6H_4-O-(CH_2)_2-O-(CH_2)_3Si(OCH_3)_3$, (in the above formulas, X is chlorine, bromine or iodine), and the like.

As further examples of the crosslinking silyl-containing organic halide, there may be mentioned those having a structure represented by the general formula (9):

$$(R^{12})_{3-a}(Y)_aSi-[OSi(R^{11})_{2-b}(Y)_b]_m-CH_2-C(H)(R^5)-R^9-C(R^6)(X)-R^{10}-R^7 \qquad (9)$$

wherein $R^5$, $R^6$, $R^7$, $R^9$, $R^{10}$, $R^{11}$, $R^{12}$, a, b, m, X and Y are as defined above.

Specific examples of such compounds are as follows:

$(CH_3O)_3SiCH_2CH_2C(H)(X)C_6H_5$, $(CH_3O)_2(CH_3)SiCH_2CH_2C(H)(X)C_6H_5,$ $(CH_3O)_3Si(CH_2)_2C(H)(X)\!-\!CO_2R,$ $(CH_3O)_2(CH_3)Si(CH_2)_2C(H)(X)\!-\!CO_2R,$ $(CH_3O)_3Si(CH_2)_3C(H)(X)\!-\!CO_2R,$ $(CH_3O)_2(CH_3)Si(CH_2)_3C(H)(X)\!-\!CO_2R,$ $(CH_3O)_3Si(CH_2)_4C(H)(X)\!-\!CO_2R,$ $(CH_3O)_2(CH_3)Si(CH_2)_4C(H)(X)\!-\!CO_2R,$ $(CH_3O)_3Si(CH_2)_9C(H)(X)\!-\!CO_2R,$ $(CH_3O)_2(CH_3)Si(CH_2)_9C(H)(X)\!-\!CO_2R,$ $(CH_3O)_3Si(CH_2)_3C(H)(X)\!-\!C_6H_5,$ $(CH_3O)_2(CH_3)Si(CH_2)_3C(H)(X)\!-\!C_6H_5,$ $(CH_3O)_3Si(CH_2)_4C(H)(X)\!-\!C_6H_5,$ $(CH_3O)_2(CH_3)Si(CH_2)_4C(H)(X)\!-\!C_6H_5,$ (in the above formulas, X is chlorine, bromine or iodine and R is an alkyl group containing 1 to 20 carbon atoms, an aryl group containing 6 to 20 carbon atoms or an aralkyl group containing 7 to 20 carbon atoms), and the like.

The above-mentioned hydroxy-containing organic halide or halogenated sulfonyl compound is not particularly restricted but includes, among others, compounds of the formula:

$$HO\!-\!(CH_2)_n\!-\!OC(O)C(H)(R)(X)$$

wherein X is chlorine, bromine or iodine, R is a hydrogen atom or an alkyl group containing 1 to 20 carbon atoms, an aryl group containing 6 to 20 carbon atoms or an aralkyl group containing 7 to 20 carbon atoms and n is an integer of 1 to 20.

The above-mentioned amino-containing organic halide or halogenated sulfonyl compound is not particularly restricted but includes, among others, compounds of the formula:

$$H_2N\!-\!(CH_2)_n\!-\!OC(O)C(H)(R)(X)$$

wherein X is chlorine, bromine or iodine, R is a hydrogen atom or an alkyl group containing 1 to 20 carbon atoms, an aryl group containing 6 to 20 carbon atoms or an aralkyl group containing 7 to 20 carbon atoms and n is an integer of 1 to 20.

The above-mentioned epoxy-containing organic halide or halogenated sulfonyl compound is not particularly restricted but includes, among others, compounds of the formula:

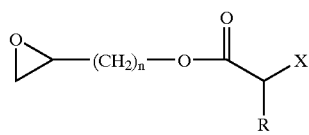

wherein X is chlorine, bromine or iodine, R is a hydrogen atom or an alkyl group containing 1 to 20 carbon atoms, an aryl group containing 6 to 20 carbon atoms or an aralkyl group containing 7 to 20 carbon atoms and n is an integer of 1 to 20.

Since the macromonomer of the invention terminally has one polymerizable carbon—carbon bond, it is generally preferred to use an initiator having one terminal initiation site, such as mentioned above. In some instances, however, an organic halide or halogenated sulfonyl compound having two or more initiation sites is used as the initiator in atom transfer radical polymerization. Such an initiator is suitable in producing a polymer having two or more terminal polymerizable carbon—carbon double bonds which can give a crosslinked polymer (gel) by polymerizing with the macromonomer of the invention. Specific examples are as follows:

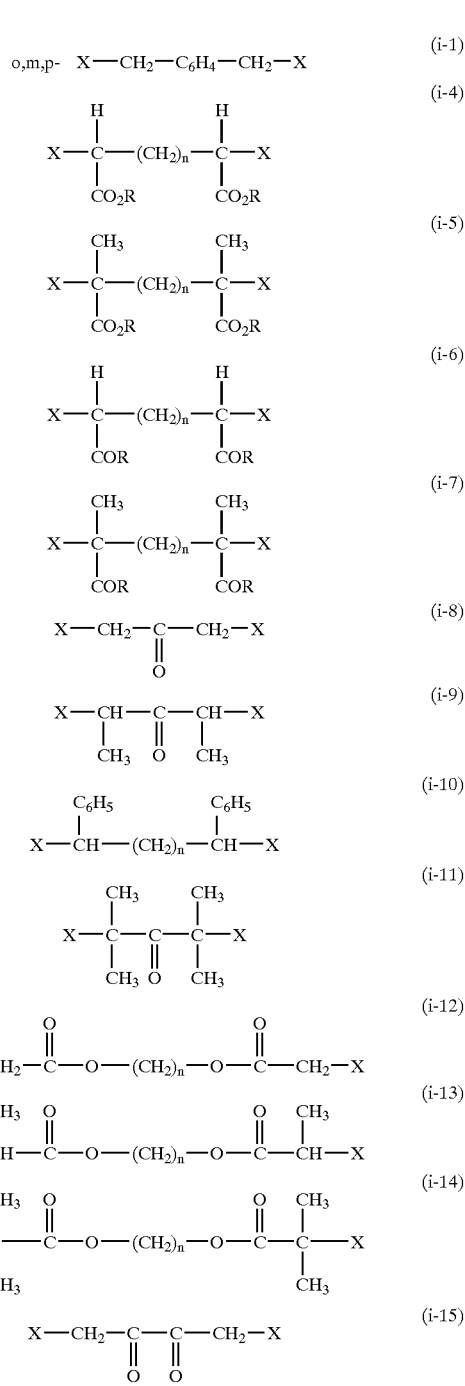

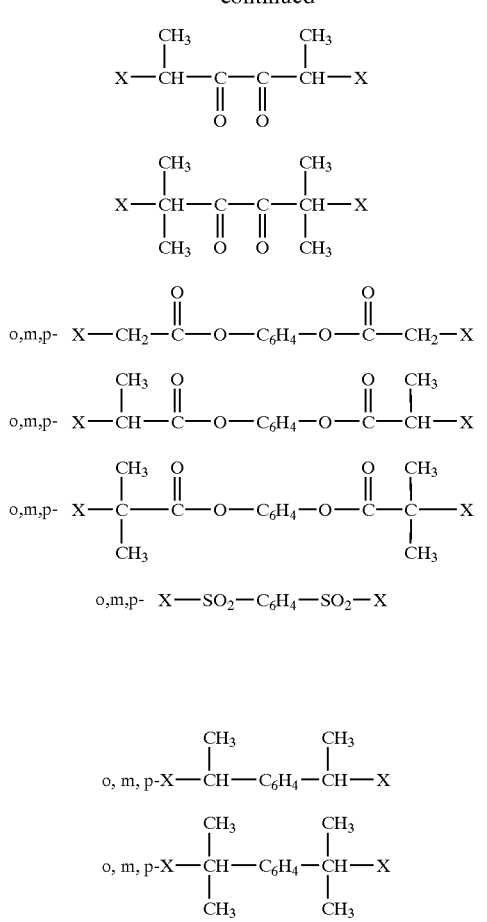

In the above formulas X represents a halogen atom.

The vinyl monomer to be used in this polymerization is not particularly restricted but any of those already mentioned specifically hereinabove can favorably be used.

The transition metal catalyst to be used as the polymerization catalyst is not particularly restricted but metal complexes having, as the central metal, an element of the group 7, 8. 9, 10 or 11 of the periodic table are preferred. More preferred are complexes of copper of valence 0 (zero), monovalent copper, divalent ruthenium, divalent iron or divalent nickel. In particular, copper complexes are preferred. Specific monovalent copper compounds are cuprous chloride, cuprous bromide, cuprous iodide, cuprous cyanide, cuprous oxide, cuprous perchlorate and the like. When a copper compound is used, a ligand, such as 2,2'-bipyridyl or a derivative thereof, 1,10-phenanthroline or a derivative thereof, tetramethylethylenediamine, pentamethyldiethylenetriamine, hexamethyltris(2-aminoethyl)amine or a like polyamine, is added for increasing the catalytic activity. A tristriphenylphosphine-ruthenium (II) chloride complex (RuCl$_2$(PPh$_3$)$_3$) is also suited for use as the catalyst. When a ruthenium compound is used as the catalyst, an aluminum alkoxide is added as an activator. Further, a bistriphenylphosphine complex of divalent iron (FeCl$_2$(PPh$_3$)$_2$), a bistriphenylphosphine complex of divalent nickel (NiCl$_2$(PPh$_3$)$_2$) and a bistributylphosphine complex of divalent nickel (NiBr$_2$(PBu$_3$)$_2$) are also suited as the catalysts.

The polymerization can be carried without using any solvent or in various solvents. The solvents include hydrocarbon solvents such as benzene and toluene, ether solvents such as diethyl ether and tetrahydrofuran, halogenated hydrocarbon solvents such as methylene chloride and chloroform, ketone solvents such as acetone, methyl ethyl ketone and methyl isobutyl ketone, alcohol solvents such as methanol, ethanol, propanol, isopropanol, n-butyl alcohol and tert-butyl alcohol, nitrile solvents such as acetonitrile, propionitrile and benzonitrile, ester solvents such as ethyl acetate and butyl acetate, and carbonate solvents such as ethylene carbonate and propylene carbonate, among others. These may be used singly or two or more of them may be used in admixture. The polymerization can be carried out in a temperature range of room temperature to 200° C., preferably 50 to 150° C.

<Method of Functional Group Introduction>

In the following, the introduction of a terminal functional group into a polymer to give a macromonomer (I) in the practice of the invention is described.

For introducing a group represented by the general formula (1) terminally into a polymer in the practice of the invention, the following methods, among others, may be mentioned.

① The production method which comprises substituting a compound having a radical-polymerizable carbon—carbon double bond for the terminal halogen group of a vinyl polymer. In a specific example, a vinyl polymer having a terminal structure represented by the above general formula (2) is reacted with a compound represented by the above general formula (3).

② The method which comprises reacting a hydroxy-terminated vinyl polymer with a compound represented by the above general formula (4).

③ The method which comprises reacting a hydroxy-terminated vinyl polymer with a diisocyanate compound and then reacting the residual isocyanato group with a compound represented by the above general formula (5).

In the following, these methods are described in detail.

<Functional Group Introduction Method ①>

This method ① is now described.

The vinyl polymer having a terminal structure represented by the general formula (2) is produced by the method comprising polymerizing a vinyl monomer using the above-mentioned organic halide or halogenated sulfonyl compound as the initiator and a transition metal complex as the catalyst, or by the method comprising polymerizing a vinyl monomer using a halogen compound as the chain transfer agent. The former method is preferred, however.

The compound represented by the general formula (3) is not particularly restricted. Thus, R is not particularly restricted as far as it is a monovalent organic group containing 1 to 20 carbon atoms but includes, for example, substituted or unsubstituted hydrocarbon groups containing 1 to 20 carbon atoms, ether groups, acyl groups, carbon- and nitrogen-containing groups, carbon- and sulfur-containing groups, carbon- and oxygen-containing groups, and the like, more specifically, —H, —CH$_3$, —CH$_2$CH$_3$, —(CH$_2$)$_n$CH$_3$ (n being an integer of 2 to 19), —C$_6$H$_5$, —CH$_3$OH, —CN and so forth. Preferred are —H and —CH$_3$, however. M$^+$ is a counter cation to the oxy anion and, as species of M$^+$, there may be mentioned alkali metal ions, specifically the lithium ion, sodium ion and potassium ion, and quaternary ammonium ions. As the quaternary ammonium ions, there may be mentioned the tetramethylammonium ion, tetraethylammonium ion, tetrabenzylammonium ion, trimethyldodecylammonium ion, tetrabutylammonium ion, dimethylpiperidinium ion and the like. Among these, the sodium ion and potassium ion are preferred. The oxy anion of the general formula (3) is used preferably in an amount of 1 to 5 equivalents, more preferably 1.0 to 1.2 equivalents, relative to the halogen-containing terminal group of the general formula (2).

The solvent to be used in carrying out this reaction is not particularly restricted but, since the reaction is a nucleophilic substitution reaction, a polar solvent is preferred. Thus, for example, tetrahydrofuran, dioxane, diethyl ether, acetone, dimethyl sulfoxide, dimethylformamide, dimethylacetamide, hexamethylphosphoric triamide, acetonitrile and the like are used. The reaction temperature is not restricted but generally it is carried out at 0 to 150° C., preferably at room temperature to 100° C. so that the polymerizable terminal group may be retained.

<Functional Group Introduction Method ②>

This method ② is now described.

The compound represented by the above general formula (4) is not particularly restricted. Thus, R is not particularly restricted as far as it is a monovalent organic group containing 1 to 20 carbon atoms but includes, for example, substituted or unsubstituted hydrocarbon groups containing 1 to 20 carbon atoms, ether groups, acyl groups, carbon- and nitrogen-containing groups, carbon- and sulfur-containing groups, carbon- and oxygen-containing groups, and the like, more specifically, —H, —CH$_3$, —CH$_2$CH$_3$, —(CH$_2$)$_n$CH$_3$ (n being an integer of 2 to 19), —C$_6$H$_5$, —CH$_2$OH, —CN and so forth. Preferred are —H and —CH$_3$, however.

The hydroxy-terminated vinyl polymer is produced by the method comprising polymerizing a vinyl monomer using the above-mentioned organic halide or halogenated sulfonyl compound as the initiator and a transition metal complex as the catalyst, or by the method comprising polymerizing a vinyl monomer using a hydroxy-containing compound as the chain transfer agent. The former method is preferred, however. These methods of producing hydroxy-terminated vinyl polymers are not restricted but include, for example, the following techniques.

(a) The technique comprising reacting a compound having both a polymerizable alkenyl group and a hydroxy group in each molecule, such as a compound represented by the general formula (10) given below, as a second monomer, in synthesizing a vinyl polymer by living radical polymerization.

wherein $R^{13}$ is a monovalent organic group containing 1 to 20 carbon atoms, preferably a hydrogen atom or a methyl group, $R^{14}$ represents —C(O)O— (ester group) or an o-, m- or p-phenylene group and $R^{15}$ represents a direct bond or a divalent organic group containing 1 to 20 carbon atoms, which may optionally have one or more ether bonds. When $R^{14}$ is an ester group, the compound is a (meth)acrylate compound and, when $R^{14}$ is a phenylene group, the compound is a styrene type compound.

The timing of subjecting to reaction the compound having both a polymerizable alkenyl group and a hydroxy group in each molecule is not restricted. When, however, rubber-like properties are particularly expected, it is preferred to effect the reaction of the monomer as a second one at the final stage of the polymerization reaction or after completion of the reaction of a predetermined monomer.

(b) The technique comprising reacting a compound having both a low-polymerizability alkenyl group and a hydroxy group in each molecule as a second monomer at the final stage of the polymerization reaction or after completion of the reaction of a predetermined monomer in synthesizing a vinyl polymer by living radical polymerization.

Such a compound is not particularly restricted, but includes compounds represented by the general formula (11):

wherein $R^{13}$ is as defined above and $R^{16}$ represents a divalent organic group containing 1 to 20 carbon atoms, which may optionally contain one or more ether bonds.

The compound represented by the above general formula (11) is not particularly restricted but, from the ready availability viewpoint, alkenyl alcohols such as 10-undecenol, 5-hexenol and allyl alcohol are preferred.

(c) The technique disclosed in Japanese Kokai Publication Hei-04-132706, namely the technique comprising effecting terminal hydroxy group introduction by hydrolyzing the halogen atom of a vinyl polymer having at least one carbon-halogen bond represented by the above general formula (2) as obtained by atom transfer radical polymerization or reacting that halogen atom with a hydroxy-containing compound.

(d) The technique comprising reacting a vinyl polymer having at least one carbon-halogen bond represented by the above general formula (2) as obtained by atom transfer radical polymerization with a hydroxy-containing stabilized carbanion represented by the general formula (12) for effecting halogen substitution.

wherein $R^{16}$ is as defined above, $R^{17}$ and $R^{18}$ each represents an electron-attracting group capable of stabilizing the carbanion C— or one of them represents such an electron-attracting group and the other represents a hydrogen atom, an alkyl group containing 1 to 10 carbon atoms or a phenyl group. As the electron-attracting group represented by $R^{17}$ and $R^{18}$, there may be mentioned, for example, —CO$_2$R (ester group), —C(O)R (keto group), —CON(R$_2$) (amide group), —COSR (thioester group), —CN (nitrile group) and —NO$_2$ (nitro group). The substituent R is an alkyl group containing 1 to 20 carbon atoms, an aryl group containing 6 to 20 carbon atoms or an aralkyl group containing 7 to 20 carbon atoms, preferably an alkyl group containing 1 to 10 carbon atoms or a phenyl group. Particularly preferred as $R^{17}$ nd $R^{18}$ are —CO$_2$R, —C(O)R and —CN.

(e) The technique comprising reacting a vinyl polymer having at least one carbon-halogen bond represented by the above general formula (2) as obtained by atom transfer radical polymerization with a simple substance metal, such as zinc, or an organometallic compound and then reacting the thus-prepared enolate anion with an aldehyde or ketone.

(f) The technique comprising reacting a vinyl polymer having at least one terminal halogen, preferably in the form represented by the above general formula (2), with a hydroxy-containing oxy anion represented by the general formula (13) given below or a hydroxy-containing carboxylate anion represented by the general formula (14) given below or the like to effect substitution of a hydroxy-containing substituent for the above halogen.

($R^{16}$ and $M^+$ being as defined above);

($R^{16}$ and $M^+$ being as defined above).

In cases that no halogen is directly involved in hydroxy group introduction, as in (a) and (b), the technique (b) is more preferred in the practice of the invention because of easier controllability.

In cases that hydroxy group introduction is effected by converting the halogen atom of a vinyl polymer having at least one carbon-halogen bond, as in (c) to (f), the technique (f) is more preferred because of easier controllability.

<Terminal Functional Group Introduction ③>

This method ③ is now described.

The compound represented by the above general formula (5) is not particularly restricted. Thus, R is not particularly restricted as far as it is a monovalent organic group containing 1 to 20 carbon atoms but includes substituted or unsubstituted hydrocarbon groups containing 1 to 20 carbon atoms, ether groups, acyl groups, carbon- and nitrogen-containing groups, carbon- and sulfur-containing groups, carbon- and oxygen-containing groups, and the like, more specifically, —H, —$CH_3$, —$CH_2CH_3$, —$(CH_2)_nCH_3$ (n being an integer of 2 to 19), —$C_6H_5$, —$CH_2OH$, —CN and so forth. Preferred are —H and —$CH_3$, however. As a specific compound, there may be mentioned 2-hydroxypropyl methacrylate.

The hydroxy-terminated vinyl polymer to be used may be the same as mentioned hereinabove.

The diisocyanate compound is not particularly restricted but includes those known in the art. Thus, for example, mention may be made of isocyanate compounds such as tolylene diisocyanate, 4,4'-diphenylmethanediisocyanate, hexamethylene diisocyanate, xylylene diisocyanate, metaxylylene diisocyanate, 1,5-naphthalenediisocyanate, hydrogenated diphenylmethanediisocyanate, hydrogenated toluylene diisocyanate, hydrogenated xylylene diisocyanate and isophoronediisocyanate. These may be used singly or two or more of them may be used combinedly. Blocked isocyanates may also be used.

For putting better weathering resistance to use, the use of aromatic ring-free diisocyanate compounds, such as hexamethylene diisocyanate and hydrogenated diphenylmethanediisocyanate, is preferred.

<Method of Polymerizing the Polymer of the Invention>

The method of polymerizing the macromonomer (I) according to the invention is not restricted but preferably is radical polymerization, more preferably living radical polymerization, still more preferably atom transfer radical polymerization. The atom transfer radical polymerization is carried out preferably using a transition metal complex having, as the central metal, an element of the group 7, 8, 9, 10 or 11 of the periodic table, more preferably a metal complex the metal of which is selected from the group consisting of copper, nickel, ruthenium and iron, particularly preferably a copper complex.

The polymerization of the macromonomer (I) is also preferably effected by using active radiation for initiating the polymerization or by initiating the polymerization by heating.

The polymerization of the macromonomer (I) may also effected by anionic polymerization.

Homopolymerization of the macromonomer (I) of the invention gives a stellar polymer, copolymerization of the macromonomer (I) with a copolymerizable monomer other than the macromonomer gives a graft copolymer, and copolymerization of the macromonomer (I) with a polyfunctional compound having two or more polymerizable carbon—carbon double bonds per molecule, preferably a polymer (III) terminally having such double bonds, gives a gel.

In the following, the method of polymerizing the macromonomer (I) is described in detail.

(Anionic Polymerization)

The initiator to be used in the anionic polymerization is not particularly restricted but includes, among others, monofunctional initiators such as sec-butyllithium and tert-butyllithium, 1,4-dilithiobutane, dilithiobutadiene and dilithionaphthalene. These may be used in combination with diphenylethylene, α-methylstyrene or the like to form initiation systems.

As the coplymerizable monomer (II) other than the macromonomer, there may be mentioned anionically polymerizable monomers, for example, aromatic monomers such as styrene, α-methylstyrene, p-methylstyrene, o-methylstyrene, p-butylstyrene, methoxystyrene, 1-vinylnaphthalene, 3-ethyl-1-biphenylnaphthalene and p-N,N-diemthylaminostyrene; (meth)acrylic monomers such as (meth)acrylic acid, methyl(meth)acrylate, ethyl(meth)acrylate, n-propyl (meth)acrylate, isopropyl(meth)acrylate, n-butyl(meth)acrylate, isobutyl(meth)acrylate, tert-butyl(meth)acrylate, n-pentyl(meth)acrylate, n-hexyl(meth)acrylate, cyclohexyl(meth) acrylate, n-heptyl(meth)acrylate, n-octyl(meth)acrylate, 2-ethylhexyl(meth)acrylate, nonyl(meth)acrylate, decyl (meth)acrylate, dodecyl(meth)acrylate, phenyl(meth)acrylate, toluyl(meth)acrylate, benzyl(meth)acrylate, 2-methoxyethyl(meth)acrylate, 3-methoxybutyl(meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylate, γ-(methacryloyloxypropyl)trimethoxysilane, trifluoromethylmethyl(meth)acrylate, 2-trifluoromethylethyl(meth)acrylate, 2-perfluoroethylethyl (meth)acrylate, 2-perfluoroethyl-2-perfluorobutylethyl (meth)acrylate, 2-perfluoroethyl(meth)acrylate, perfluoromethyl(meth)acrylate, diperfluoromethylmethyl(meth) acrylate, 2-perfluoromethyl-2-perfluoroethylmethyl(meth) acrylate, 2-perfluorohexylethyl(meth)acrylate, 2-perfluorodecylethyl(meth)acrylate, 2-perfluorohexadecylethyl(meth)acrylate and the like; conjugated dienes such as 1,3-butadiene, 1,3-pentadiene, 2,3-dimethyl-1,3-butadiene, 2,4-hexadiene, 2-phenyl-1,3-butadiene and isoprene; and nitriles such as acrylonitrile. These may be used singly or a plurality thereof may be copolymerized. Among them, styrene type monomers and (meth)acrylic monomers are preferred from the viewpoint of physical properties of products, among others. Acrylic ester monomers and methacrylic ester monomers are more preferred and butyl acrylate is still more preferred. In the practice of the invention, these preferred monomers may be copolymerized with some other monomer(s) and, in that case, the proportion of these preferred monomers is preferably 40% by weight.

While the anionic polymerization can also be carried in the absence of a solvent, it is possible to carry out the polymerization in the presence of an appropriate organic solvent. As the organic solvent, there may be mentioned, for example, aromatic hydrocarbon solvents such as benzene, toluene and xylene; aliphatic hydrocarbon solvents such as n-hexane, n-octane and isooctane; alicyclic hydrocarbon solvents such as methylcyclopentane, cyclohexane and cyclooctane; and ether solvents such as tetrahydrofuran, dioxane and diethyl ether.

As for the polymerization conditions, those conditions employed in ordinary anionic polymerization can be used. For preventing the living sites of the polymerization initiator and at the polymer terminus from being inactivated, however, it is preferred to carry out the polymerization under conditions such that oxygen, carbon dioxide or water, for instance, cannot enter the polymerization system. For example, a polymerization initiator is added to a solvent deaerated and dehydrated under high vacuum or in a nitrogen atmosphere almost free of moisture and, then, the anionically polymerizable monomer mentioned above is added and the anionic polymerization is allowed to proceed. It is also possible to carry out the polymerization by adding the polymerization initiator and monomer gradually, not by adding them all at once.

When two or more of the above-mentioned anionically polymerizable monomers are combinedly subjected to polymerization, polymers having an arbitrary monomer composition can be obtained. When another or other monomers are subjected in succession to polymerization following completion of the polymerization of one monomer, block copolymers, diblock copolymers, triblock copolymers, multiblock copolymers and the like respectively having an arbitrary monomer composition and structure can be obtained. When the macromonomer (I) is added during such polymerization, graft copolymers with the macromonomer (I) incorporated at an appropriate position(s) are obtained.

The polymerization temperature may vary according to the polymerization initiator, monomer(s) and solvent employed, among others, but, generally, it is preferably within the range of $-100°$ C. to $150°$ C., more preferably within the range of $-78°$ C. to $80°$ C. The polymerization time may vary according to the polymerization initiator, monomer(s), solvent and reaction temperature employed, among others, but, generally, it is preferably within the range of 10 minutes to 10 hours. The polymerization reaction may be carried out batchwise, semibatchwise or continuously.

(Radical Polymerization)

The radical polymerization is not particularly restricted in mode but may be carried out in the manner of ordinary free radical polymerization, chain transfer radical polymerization or living radical polymerization, for instance.

In the radical polymerization, all the radical-polymerizable monomers mentioned hereinabove referring to the production of the main chain of the macromonomer (I) can be used as the monomer (II) copolymerizable with the macromonomer (I).

The radical polymerization may be carried out without using any solvent or using any of those solvents mentioned above referring to the production of the main chain of the macromonomer (I).

The initiator to be used in free radical polymerization is not particularly restricted but includes, among others, radical initiators such as organic peroxides, e.g. benzoyl peroxide and tert-butyl peroxide, and azo compounds, e.g. 2,2'-azobisisobutyronitrile, 2,2'-azobis(4-methoxy-2,4-dimethylvaleronitrile), 2,2'-azobis(2-cyclopropyl-propionitrile) and 2,2'-azobis(2-methylbutyronitrile).

In the chain transfer radical polymerization, a chain transfer agent is added to the system of the above-mentioned free radical polymerization. As the initiator, any of those mentioned above can be used. The chain transfer agent is not particularly restricted but may be n-dodecylmercaptan, tert-dodecylmercaptan, n-octylmercaptan, n-octadecylmercaptan, 3-mercaptopropyltrimethoxysilane, 3-mercaptopropyltriethoxysilane, 3-mercaptopropylmethyldimethoxysilane, 3-mercaptopropylmethyldiethoxysilane, $(H_3CO)_3Si-S-S-Si(OCH_3)_3$, $CH_3(H_3CO)_2Si-S-S-SiCH_3(OCH_3)_2$, $(C_2H_5O)_3Si-S-S-Si(OC_2H_5)_3$, $CH_3(C_2H_5O)_2Si-S-$ $S-SiCH_3(OC_2H_5)_2$, $(H_3CO)_3Si-S_3-Si(OCH_3)_3$, $(H_3CO)_3Si-S_4-Si(OCH_3)_3$, $(H_3CO)_3Si-S_6-Si(OCH_3)_3$ or the like. In particular when a chain transfer agent having an alkoxysilyl group(s) within the molecule, for example 3-mercaptopropyltrimethoxysilane, is used, the alkoxysilyl group(s) can be introduced terminally into the polymer.

The living radical polymerization is not restricted but includes SFRP (stable free radical polymerization) in which the growing polymerization terminal radical is capped by TEMPO (tetramethylpiperidine oxide) or a cobalt-porphyrin complex, and that atom transfer polymerization which has been mentioned referring to the polymerization of the main chain of the macromonomer (I) of the invention, and the latter is preferred. These polymerizations are carried out under those conditions already mentioned hereinabove. When the macromonomer (I) is polymerized by living radical polymerization, it is expected that the molecular weight and molecular weight distribution of the resulting polymer chain can be controlled. As a result, when it is copolymerized with another monomer (II), graft copolymers better controlled with respect to the number of side chains in the polymer as compared with ordinary free radical polymerization can be obtained and, when the macromonomer (I) is homopolymerized, polymers better controlled with respect to the number of arms of a stellar polymer as compared with ordinary free radical polymerization can be obtained.

(Polymerization by Means of Active Radiation)

The macromonomer (I) of the invention can be polymerized by means of active radiation, such as UV rays and electron beams.

This method is not restricted but is suited for use in producing gels by polymerizing the macromonomer (I) with a polymer (III) having two or more terminal polymerizable carbon—carbon double bonds.

In actinic energy polymerization, the system preferably contains a photopolymerization initiator.

The photopolymerization initiator to be used in the practice of the invention is not particularly restricted but preferably includes photo radical initiators and photo anion initiators. Among these, photo radical initiators are preferred. As such, there may be mentioned, for example, acetophenone, propiophenone, benzophenone, xanthol, fluorescein, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl) ketone, benzyl methoxy ketal, 2-chlorothioxanthone and the like. These initiators may be used singly or in combination with another compound. Specifically, they may be combined with an amine such as diethanolmethylamine, dimethylethanolamine and triethanolamine, and in further combination with an iodonium salt such as diphenyliodonium chloride, or with a dye, such as methylene blue, and an amine.

It is also possible to use a near infrared absorbing cationic dye as a near infrared photopolymerization initiator. Preferred as the near infrared absorbing cationic dye are those near infrared absorbing cationic dye-borate anion complexes capable of being excited by light energy in the region of 650 to 1500 nm which are disclosed in, for example, Japanese Kokai Publication Hei-03-111402 and Japanese Kokai Publication Hei-05-194619, and the like. The combined use of a boron-based sensitizer is more preferred.

Since it is necessary to photofunctionalize the system only slightly, the addition amount of the photopolymerization initiator is preferably 0.001 to 10 parts by weight per 100 parts by weight of the polymer of this composition, although the addition amount is not particularly restricted.

The technique of effecting polymerization by means of active radiation is not particularly restricted but includes irradiation with light and/or electron beams using a high pressure mercury lamp, low pressure mercury lamp, electron beam irradiating apparatus, halogen lamp, light emission diode or semiconductor laser or the like, according to the properties of the photopolymerization initiator employed.

(Thermal Polymerization)

The macromonomer (I) of the invention can be polymerized by means of heat.

This method is not restricted but is suited for use in producing gels by polymerizing the macromonomer (I) with a polymer (III) having two or more terminal polymerizable carbon—carbon double bonds.

In thermal polymerization, the system preferably contains a thermal polymerization initiator.

The thermal polymerization initiator to be used in the practice of the invention is not particularly restricted but includes azo initiators, peroxides, persulfuric acid salts and redox initiators.

Suitable azo initiators are not restricted but include 2,2'-azobis(4-methoxy-2,4-dimethylvaleronitrile) (VAZO 33), 2,2'-azobis(2-amidinopropane)dihydrochloride (VAZO 50), 2,2'-azobis(2,4-dimethylvaleronitrile) (VAZO 52), 2,2'-azobis(isobutyronitrile) (VAZO 64), 2,2'-azobis-2-methylbutyronitrile (VAZO 67), 1,1'-azobis(1-cyclohexanecarbonitrile) (VAZO 88) (all available from Du Pont Chemicals), 2,2'-azobis(2-cyclopropylpropionitrile) and 2,2'-azobis(methyl isobutyrate) (V-601) (available from Wako Pure Chemical Industries), among others.

Suitable peroxide initiators are not restricted but include benzoyl peroxide, acetyl peroxide, lauroyl peroxide, decanoyl peroxide, dicetyl peroxydicarbonate, di(4-tert-butylcyclohexyl) peroxydicarbonate (Perkadox 16S) (available from Akzo Nobel), di(2-ethylhexyl) peroxydicarbonate, tert-butyl peroxypivalate (Lupersol 11) (available from Elf Atochem), tert-butyl peroxy-2-ethylhexanoate (Trigonox 21-C50) (available from Akzo Nobel) and dicumylperoxide, among others.

Suitable persulfate initiators are not restricted but include potassium persulfate, sodium persulfate and ammonium persulfate.

Suitable redox (oxidation-reduction) initiators are not restricted but include combinations of such a persulfate initiator as mentioned above with a reducing agent such as sodium hydrogen metasulfite or sodium hydrogen sulfite; systems based on an organic peroxide and a tertiary amine, for example the system based on benzoyl peroxide and dimethylaniline; and systems based on an organic hydroperoxide and a transition metal, for example the system based on cumene hydroperoxide and cobalt naphthenate; among others.

Other initiators are not restricted but include pinacols such as tetraphenyl 1,1,2,2-ethanediol, and the like.

Preferred thermal polymerization initiators can be selected from the group consisting of azo initiators and peroxide initiators. More preferred are 2,2'-azobis(methyl isobutyrate), tert-butyl peroxypivalate and di(4-tert-butylcyclohexyl) peroxydicarbonate, and mixtures of these.

The thermal initiator to be used in the practice of the invention is present in a catalytically effective amount and such amount is not restricted but typically is about 0.01 to 5 parts by weight, more preferably about 0.025 to 2 parts by weight, per 100 parts by weight of the total amount of the above macromonomer (I) and another monomer and oligomer mixture added. When an initiator mixture is used, the total amount of the initiator mixture is equal to the amount to be employed when only one initiator species is used.

In the practice of the invention, the technique of thermal polymerization is not particularly restricted but the temperature may vary according to the thermal initiator employed, the macromonomer (I) and the compound(s) to be added, among others. Generally, however, the temperature is preferably within the range of 50° C. to 250° C., more preferably within the range of 70° C. to 200° C. The polymerization time may vary according to the polymerization initiator, monomer(s), solvent, reaction temperature and other factors but, generally, within the range of 1 minute to 10 hours.

(Gel)

When the macromonomer (I) of the invention and a polyfunctional compound (monomer/oligomer), preferably a polymer (II) having two or more terminal polymerizable carbon—carbon double bonds, are polymerized, gels (crosslinked polymers) can be obtained.

The polymer (III) can be produced in the same manner as the macromonomer (I). Particularly when the technique of atom transfer radical polymerization is utilized, mention may be made of the technique comprising carrying out the polymerization using a polyfunctional initiator, followed by terminal functional group conversion.

As the polyfunctional monomer, there may be mentioned neopentyl glycol polypropoxy diacrylate, trimethylolpropane polyethoxy triacrylate, bisphenol F polyethoxy diacrylate, bisphenol A polyethoxy diacerylate, dipentaerythritol polyhexanolide hexaacrylate, tris(hydroxyethyl)isocyanurate polyhexanolide triacrylate, tricyclodecanedimethylol diacrylate, 2-(2-acryloyloxy-1,1-dimethyl)-5-ethyl-5-acryloyloxymethyl-1,3-dioxane, tetrabromobisphenol A diethoxy diacrylate, 4,4-dimercaptodiphenyl sulfide dimethacrylate, polytetraethylene glycol diacrylate, 1,9-nonanediol diacrylate, ditrimethylolpropane tetraacrylate and the like.

As the polyfunctional oligomer, there may be mentioned epoxy acrylate resins, such as bisphenol A-based epoxy acrylate resins, phenol novolak-based epoxy acrylate resins and cresol novolak-based epoxy acrylate resins, COOH-modified epoxy acrylate resins, urethane acrylate resins obtained by reacting a hydroxy-containing (meth)acrylate [e.g. hydroxyethyl(meth)acrylate, hydroxypropyl(meth)acrylate, hydroxybutyl(meth)acrylate, pentaerythritol triacrylate] with a urethane resin derived from a polyol (e.g. polytetramethylene glycol, polyester diol derived from ethylene glycol and adipic acid, ε-caprolactone-modified polyester diol, polypropylene glycol, polyethylene glycol, polycarbonate diol, hydroxy-terminated hydrogenated polyisoprene, hydroxy-terminated polybutadiene, hydroxy-terminated polyisobutylene) and an organic isocyanate (e.g. tolylene diisocyanate, isophoronediisocyanate, diphenylmethanediisocyanate, hexamethylene diisocyanate, xylylene diisocyanate), resins derived from the above-mentioned polyols by introducing a (meth)acryl group via an ester bond, and polyester acrylate resins, among others.

<Utility>

The branched polymer of the invention can be used in applications equivalent to those of existing elastomers. Specifically, it can be used in modifying resins and asphalt, in compounding with resins and block copolymers (if necessary with addition of a plasticizer, filler, stabilizer, etc.), as a shrinkage control agent for thermosetting resins, or as a base polymer in adhesives, pressure sensitive adhesives and damping materials. As specific fields of application thereof, there may be mentioned automobile interior and exterior parts, electric and electronic fields, films and tubes for food packaging, containers for drugs and containers for medical use and sealable materials, among others.

The branched polymer of the invention can itself serve also as a molding material, namely as a shock resistant resin and, when used in admixture with various thermoplastic resins or thermosetting resins, can serve as a shock resistance improving agent to provide such resins with high shock resistance. In addition, it can be used as a processability improving agent, solubilizing agent, delusterant, heat resistance improving agent or the like.

The thermoplastic resins whose shock resistance can be improved by addition of the branched polymer of the invention are not restricted but include polymethyl methacrylate resins, polyvinyl chloride resins, polyethylene resins, polypropylene resins, cyclic olefin copolymer resins, polycarbonate resins, polyester resins, polycarbonate resin-polyester resin mixtures, homopolymers and copolymers derived from 70 to 100% by weight of at lest one vinyl monomer selected from the group consisting of aromatic alkenyl compounds, cyano-containing vinyl compounds and (meth)acrylic esters and 0 to 30% by weight of another or other vinyl monomers copolymerizable with the above vinyl monomers, for example ethylene, propylene and vinyl acetate, and/or conjugated dienes such as butadiene and isoprene, polystyrene resins, polyphenylene ether resins, polystyrene resin-polyphenylene ether resin mixtures and the like. Thus, a wide range of thermoplastic resins can be used. In particular, polymethyl methacrylate resins, polyvinyl chloride resins, polypropylene resins, cyclic polyolefin resins, polycarbonate resins and polyester resins, among others, are preferred since weathering resistance, shock resistance and like features can readily be obtained with them.

As the method of adding the branched polymer of the invention to various resins, there may be mentioned the method comprising using a Banbury mixer, roll mill, twin-screw extruder or like apparatus known in the art, thus effecting mixing mechanically and shaping into pellets. The extruded and shaped pellets can be molded in a wide temperature range and, for the molding, conventional injection molding machines, blow molding machines, extrusion molding machines and like machines are used.

In these resin compositions, there may further be incorporated a shock resistance improver, stabilizer, plasticizer, lubricant, flame retardant, pigment, filler and so on, as necessary. Specifically, mention may be made of shock resistance improvers such as methyl methacrylate-butadiene-styrene copolymers (MBS resins), acrylic graft copolymers and acryl-silicone composite rubber-like graft copolymers; stabilizers such as triphenyl phosphate; lubricants such as polyethylene wax and polypropylene wax; flame retardants such as triphenyl phosphate, tricresyl phosphate and like phosphate flame retardants, decabromobiphenyl, decabromobiphenyl ether and like bromine-containing flame retardants, and antimony trioxide and like flame retardants; pigments such as titanium oxide, zinc sulfite and zinc oxide; fillers such as glass fiber, asbestos, wollastonite, mica, talc and calcium carbonate; among others.

The branched polymer, in particular stellar polymer, of the invention is useful as an additive, desirably a viscosity modifier (viscosity index improving agent) for lubricant oils and the like, although the use thereof is not particularly restricted thereto. The addition amount of the polymer of the invention to lubricant oils or the like is not particularly restricted but preferably is about 0.1% by weight to about 30% by weight, more preferably about 1% by weight to about 10% by weight. The target lubricant oils are not restricted but include oils used in automobiles, airplanes, ships and railroad vehicles, oils used in spark ignition or compression ignition, and synthetic oils or mineral oils, for instance, oils for use in the summer season, oils for use in the winter season and so forth. Typical lubricant oils preferably have a boiling point of about 300° C. to about 350° C. For facilitating the addition of the polymer of the invention to lubricant oils, it is preferred to use the polymer in the form of a concentrate containing the same in an amount of about 1 to 50% by weight, preferably about 5 to 20% by weight, in a synthetic oil or mineral oil.

The branched polymer of the invention can be used in a pressure sensitive adhesive composition.

The pressure sensitive adhesive composition of the invention preferably comprises a (meth)acrylic polymer as its main component and therefore it is not always necessary to add a tackifier resin. If necessary, however, various tackifiers can be used. Specific examples are phenol resins, modified phenol resins, cyclopentadiene-phenol resins, xylene resins, coumarone resins, petroleum resins, terpene resins, terpene-phenol resins and rosin ester resins.

In the pressure sensitive adhesive composition of the invention, various additives, for example an antioxidant, plasticizer, physical property modifier, solvent and the like may be incorporated for adjusting the physical properties of the composition.

Since the acrylic polymer is intrinsically excellent in durability, it is not always necessary to add an antioxidant. If necessary, however, conventional antioxidants and ultraviolet absorbers can be used each in an appropriate amount.

For physical property, appearance and/or consistency modification, the plasticizer includes phthalic esters such as dibutyl phthalate, diheptyl phthalate, di(2-ethylhexyl) phthalate and butyl benzyl phthalate; nonaromatic dicarboxylic acid esters such as dioctyl adipate and dioctyl sebacate; polyalkylene glycol esters such as diethylene glycol dibenzoate and triethylene glycol dibenzoate; phosphate esters such as tricresyl phosphate and tributyl phosphate; chlorinated paraffins; hydrocarbon oils such as alkyldiphenyls and partially hydrogenated terphenyl; and so forth, and these may be used singly or two or more of them may be used in admixture. They are not always necessary, however. These plasticizers may be incorporated in the step of polymer manufacture as well.

As the solvent, there may be mentioned, for example, aromatic hydrocarbon solvents, such as toluene and xylene, ester solvents, such as ethyl acetate, butyl acetate, amyl acetate and cellosolve acetate, and ketone solvents, such as methyl ethyl ketone, methyl isobutyl ketone and diisobutyl ketone. These solvents may be used in the step of polymer manufacture.

Various adhesion improving agents may be added to the pressure sensitive adhesive composition of the invention to thereby improve the adhesion to various supports (plastic films, paper, etc.). Examples are alkylalkoxysilanes such as methyltrimethoxysilane, dimethyldimethoxysilane, trimethylmethoxysilane and n-propyltrimethoxysilane; functional group-containing alkoxysilanes, for example alkylisopropenoxysilanes such as dimethyldiisopropenoxysilane, methyltriisopropenoxysilane and γ-glycidoxypropylmethyldiisopropenoxysilane, γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)-γ-aminopropyltrimethoxysilane, N-(β-aminoethyl)-γ-aminopropylmethyldimethoxysilane, γ-mercaptopropyltrimethoxysilane and γ-mercaptopropylmethyldimethoxysilane; silicone varnishes; and polysiloxanes.

The pressure sensitive adhesive composition of the invention can be widely applied to tapes, sheets, labels, foils and the like. For example, the pressure sensitive adhesive composition, in the form of a solution, emulsion or hot melt, is applied to films made of a synthetic resin or modified natural resin, paper, all kinds of cloths, metal foils, metallized plastic foils, asbestos or glass fiber and like substrate materials and then cured by means of actinic energy radiation or heat.

In addition, the polymer of the invention can be used in sealing materials, paints, coating compositions, sealants, adhesives, potting materials, casting materials, molding materials and so forth.

BEST MODES FOR CARRYING OUT THE INVENTION

The following specific examples and comparative examples illustrate the present invention. The examples are, however, by no means limitative of the scope of the invention.

In the examples, "part(s)" and "%" indicate "part(s) by weight" and "% by weight", respectively.

In the examples, the "number average molecular weight" and "molecular weight distribution (ratio of weight average molecular weight to number average molecular weight)" were determined on the standard polystyrene basis using gel permeation chromatography (GPC). The GPC column used was a crosslinked polystyrene gel-packed one and the GPC solvent used was chloroform.

In the examples, the "mean number of terminal (meth)acryloyl groups" is the "number of (meth)acryloyl groups introduced per polymer molecule" as calculated based on the results of $^1$H NMR analysis and the number average molecular weight determined by GPC.

PRODUCTION EXAMPLE 1

Synthesis of Br-Terminated Poly(Butyl Acrylate)-(1)

A 2-L separable flask equipped with a reflux condenser and stirrer was charged with CuBr (5.54 g, 38.6 mmol) and the reaction vessel was purged with nitrogen. Acetonitrile (73.8 mL) was added, and the contents were stirred on an oil bath at 70° C. for 30 minutes. Thereto were added butyl acrylate (132 g), methyl 2-bromopropionate (14.4 mL, 0.129 mol) and pentamethyldiethylenetriamine (4.69 mL, 0.022 mol), and the reaction was started thereby. While heating at 70° C. with stirring, butyl acrylate (528 g) was added dropwise continuously over 90 minutes and thereafter heating was continued with stirring for 80 minutes.

The reaction mixture was diluted with toluene and passed through an activated alumina column, and the volatile matter was distilled off under reduced pressure to give poly(butyl acrylate) having a Br-containing group at one terminus (hereinafter referred to as polymer [1]). The polymer [1] had a number average molecular weight of 5,800 and a molecular weight distribution of 1.14.

PRODUCTION EXAMPLE 2

Synthesis of Potassium Acrylate

A flask was charged with methanol (500 mL) and the contents were cooled to 0° C. Thereto was added tert-butoxypotassium (78 g) in several divided portions. This reaction mixture was maintained at 0° C. and a methanol solution of acrylic acid (50 g) was added dropwise thereto. After completion of the dropping, the temperature of the reaction mixture was returned from 0° C. to room temperature and then the volatile matter was distilled off from the reaction mixture under reduced pressure to give potassium acrylate (hereinafter referred to as carboxylic acid salt [1]) represented by the following formula:

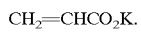

$CH_2=CHCO_2K$.

PRODUCTION EXAMPLE 3

Synthesis of Potassium Methacrylate

A flask was charged with methanol (800 mL) and the contents were cooled to 0° C. Thereto was added tert-butoxypotassium (130 g) in several divided portions. This reaction mixture was maintained at 0° C. and a methanol solution of methacrylic acid (100 g) was added dropwise thereto. After completion of the dropping, the temperature of the reaction mixture was returned from 0° C. to room temperature and then the volatile matter was distilled-off from the reaction mixture under reduced pressure to give potassium methacrylate (hereinafter referred to as carboxylic acid salt [2]) represented by the following formula:

$CH_2=C(CH_3)CO_2K$.

EXAMPLE 1

Synthesis of Acryloyl Group-Containing Macromonomer

A 500-mL flask equipped with a reflux condenser was charged with the polymer [1] (150 g) obtained in Production Example 1, the carboxylic acid salt [1] (6.61 g) obtained in Production Example 2 and dimethylacetamide (150 mL) and the mixture was heated at 70° C. for 3 hours with stirring to give poly(butyl acrylate) having an acryloyl group at one terminus (hereinafter referred to as macromonomer [1]). The macromonomer [1] was purified by distilling off the dimethylacetamide from the reaction mixture, dissolving the residues in toluene, passing the solution through an activated alumina column and then distilling off the toluene. The mean number of terminal acryloyl groups of the macromonomer [1] was 1.1 and the number average molecular weight was 6,000 and the molecular weight distribution was 1.14.

EXAMPLE 2

Synthesis of Methacryloyl Group-Containing Macromonomer

A 500-mL flask equipped with a reflux condenser was charged with the polymer [1] (150 g) obtained in Production Example 1, the carboxylic acid salt [2] (7.45 g) obtained in Production Example 3 and dimethylacetamide (150 mL) and the mixture was heated at 70° C. for 3 hours with stirring to give poly(butyl acrylate) having an methacryloyl group at one terminus (hereinafter referred to as macromonomer [2]). The macromonomer [2] was purified by distilling off the dimethylacetamide from the reaction mixture, dissolving the residues in toluene, passing the solution through an activated alumina column and then distilling off the toluene. The mean number of terminal methacryloyl groups of the macromonomer [2] was 1.0 and the number average molecular weight was 6,000 and the molecular weight distribution was 1.13.

EXAMPLE 3

Synthesis of a Stellar Polymer-(1)

The macromonomer [1] (100 parts) was thoroughly blended with diethoxyacetophenone (0.2 part), which was used as a photo radical generator, to give a composition. The composition was defoamed under reduced pressure and poured into a glass mold and covered with a glass plate to prevent the surface from contacting with the air. Radical polymerization was effected by irradiating with light from a high pressure mercury lamp (SHL-100UVQ-2; product of Toshiba Litech) at an irradiation distance of 20 cm for 5 minutes. Formation of a macromolecular substance (number average molecular weight 112,000, molecular weight distribution 1.28) was confirmed.

EXAMPLE 4

Synthesis of a Stellar Polymer-(2)

The macromonomer [1] (100 parts) was thoroughly blended with diethoxyacetophenone (0.2 part), which was used as a photo radical generator, and laurylmercaptan (1.0 part), which was used as a chain transfer agent, to give a composition. The composition was defoamed under reduced pressure and poured into a glass mold and covered with a glass plate to prevent the surface from contacting with the air. Radical polymerization was effected by irradiating with light from a high pressure mercury lamp (SHL-100UVQ-2; product of Toshiba Litech) at an irradiation distance of 20 cm for 5 minutes. Formation of a macromolecular substance (number average molecular weight 17,500, molecular weight distribution 1.38) was confirmed.

EXAMPLE 5

Synthesis of a Stellar Polymer-(3)

The procedure of Example 4 was followed in the same manner except that the macromonomer [2] (100 parts) was used in lieu of the macromonomer [1] (100 parts). Formation of a macromolecular substance (number average molecular weight 30,000, molecular weight distribution 1.17) was confirmed.

EXAMPLE 6

Synthesis of a Graft Copolymer

A 100-mL three-necked flask equipped with a reflux condenser was charged with the macromonomer [2] (5.0 g), methyl methacrylate (7.5 mL, 70 mmol), 2,2'-azobisisobutyronitrile (0.460 g, 2.8 mmol) and toluene (10 mL), and the dissolved oxygen was removed by blowing nitrogen gas into the mixture for 15 minutes. Four hours of heating at 60° C. with stirring gave a graft copolymer. The graft copolymer was purified by repeated reprecipitation in methanol. The graft copolymer had a number average molecular weight of 36,000 and a molecular weight distribution of 1.71.

The graft copolymer obtained in this experiment is comprised of poly(methyl methacrylate) as a trunk polymer and poly(butyl acrylate) as polymer branches.

PRODUCTION EXAMPLE 4

Synthesis of Poly(Butyl Acrylate) Having Acryloyl Groups at Both Termini n-Butyl acrylate was polymerized using cuprous bromide as the catalyst, pentamethyldiethyelenetriamine as the ligand and diethyl 2,5-dibromoadipate as the initiator, to give bromine-terminated poly(n-butyl acrylate) with a number average molecular weight of 10,800 and a molecular weight distribution of 1.15.

This polymer (300 g) was dissolved in N,N-dimethylacetamide (300 mL), 7.4 g of the carboxylic acid salt [1] was added, and the mixture was heated at 70° C. for 3 hours with stirring in a nitrogen atmosphere to give a mixture of poly(n-butyl acrylate) having acryloyl groups at both termini (hereinafter referred to as telechelic oligomer [1]). The telechelic oligomer [1] was purified by distilling off the N,N-dimethylacetamide from the mixture under reduced pressure, adding toluene to the residue, filtering off the insoluble matter and distilling off the toluene from the filtrate under reduced pressure.

The mean number of terminal acryloyl groups in the telechelic oligomer [1] was 2.0.

EXAMPLES 7 TO 9

Preparation of Cured Pressure Sensitive Adhesive Compositions

The macromonomer [1], the telechelic oligomer [1] and diethoxyacetophenone were mixed up according to the formulations shown in Table 1. Each of the resulting compositions was defoamed under reduced pressure and then filled into a mold, the surface thereof was covered with a glass plate, to give a test specimen. The thus-prepared test specimens were irradiated with light using a high pressure mercury lamp (SHL-100UVQ-2; product of Toshiba Litech) (irradiation conditions: irradiation time 5 minutes, irradiation distance 20 cm), whereupon rubber-like cured products having surface adhesiveness were obtained.

The cured products obtained were measured for gel fraction. The gel fraction was calculated in terms of the ratio between the weight before extracting the uncured portion from the cured product and the weight after extraction. The extraction of the uncured portion was effected by immersing the cured product in toluene. The thus-obtained results are also shown in Table 1.

TABLE 1

|  | Example 7 | Example 8 | Example 10 |
|---|---|---|---|
| Macromonomer [1] (parts) | 70 | 50 | 30 |
| Telechelic oligomer (parts) | 30 | 50 | 70 |
| Diethoxyacetophenone (parts) | 0.2 | 0.2 | 0.2 |
| Gel fraction (%) | 93 | 93 | 90 |

EXAMPLE 10

Preparation and Testing of a Pressure Sensitive Adhesive Sheet

The macromonomer [1] (70 parts), the telechelic oligomer [1] (30 parts) and diethoxyacetophenone (2 parts) were mixed up to give a pressure sensitive adhesive composition. The pressure sensitive adhesive composition obtained was applied to a corona-treated 50-μm-thick polyethylene terephthalate film (product of Toray) and irradiated with light in a nitrogen atmosphere using a high pressure mercury lamp (SHL-100UVQ-2; product of Toshiba Litech) for 10 minutes for effecting curing.

The thus-obtained pressure sensitive adhesive sheet was subjected to the inclined ball tack test according to JIS Z 0237. The maximum ball number was 3. The approach was 100 mm long, the measuring part was 100 mm long and the angle of inclination was 20 degrees.

INDUSTRIAL APPLICABILITY

In accordance with the invention, a vinyl polymer macromonomer having a polymerizable carbon—carbon double bond, such as a (meth)acryloyl group, terminally introduced therein with a high probability is used and, therefore, those graft copolymers, stellar polymers, gels and the like which have vinyl polymer branches and have so far been difficult to synthesize can be synthesized with ease. Furthermore, by producing the macromonomer by living radical polymerization, in particular atom transfer radical polymerization, it becomes possible to produce the above polymers or gels having well controlled side chain molecular weights.

What is claimed is:

1. A production method of a branched polymer comprising performing living radical polymerization to obtain a macromonomer (I), said macromonomer (I) being a vinyl polymer terminally having one polymerizable carbon—carbon double bond-containing group per molecule, and
    polymerizing said macromonomer (I);
    wherein the macromonomer (I) has a weight average molecular weight (Mw)-to-number average molecular weight (Mn) ratio (Mw/Mn) of less than 1.8 as determined by gel permeation chromatography,
    wherein the polymerizable carbon—carbon double bond-containing group is represented by the general formula (1):

—OC(O)C(R)=CH$_2$     (1)

wherein R represents a hydrogen atom or a monovalent organic group containing 1 to 20 carbon atoms.

2. The production method to claim 1 wherein R is a hydrogen atom or a methyl group.

3. The production method according to claim 1, wherein the living radical polymerization is atom transfer radical polymerization.

4. The production method according to claim 3, wherein the atom transfer radical polymerization is carried out using, as a catalyst, a transition metal complex whose central metal is an element of the group 7, 8, 9, 10 or 11 of the periodic table.

5. The production method according to claim 4, wherein the metal complex to serve as a catalyst is a complex of a metal selected from the group consisting of copper, nickel, ruthenium and iron.

6. The production method according to claim 5, wherein the catalyst metal complex is a copper complex.

7. The production method according to claim 1, wherein the main chain of the macromonomer (I) is a (meth)acrylic polymer.

8. The production method according to claim 7, wherein the polymer main chain of the macromonomer (I) is an acrylic ester polymer.

9. The production method according to claim 1, wherein the main chain of the macromonomer (I) is a styrene type polymer.

10. The production method according to claim 1, wherein the macromonomer (I) is obtained by reacting a hydroxy-terminated vinyl polymer with a compound represented by the general formula (4):

XC(O)C(R)=CH$_2$     (4)

wherein R represents a hydrogen atom or a monovalent organic group containing 1 to 20 carbon atoms and X represents a chlorine, bromine atom or a hydroxy group.

11. The production method according to claim 1, wherein the macromonomer (I) is obtained by reacting a hydroxy-terminated vinyl polymer with a diisocyanate compound and reacting the remaining isocyanato group with a compound represented by the general formula (5):

HO—R'—OC(O)C(R)=CH$_2$     (5):

wherein R represents a hydrogen atom or a monovalent organic group containing 1 to 20 carbon atoms and R' represents a divalent organic group containing 2 to 20 carbon atoms.

12. A production method according to claim 1, wherein the macromonomer (I) has a number average molecular weight of not less than 3,000.

13. The production method according to claim 1, wherein polymerization of the macromonomer (I) is initiated by active radiation.

14. The production method according to claim 1, wherein polymerization of the macromonomer (I) is initiated by heating.

15. The production method according to claim 1, wherein polymerization of the macromonomer (I) is conducted in the manner of anionic polymerization.

16. The production method according to claim 1, wherein homopolymerization of the macromonomer (I) gives a stellar polymer.

17. The production method according to claim 1, wherein the copolymerization of the macromonomer (I) with a copolymerizable monomer (II) other than said macromonomer (I) gives a graft copolymer.

18. The production method according to claim 17, wherein the weight ratio between the macromonomer (I) and the monomer (II) is 95:5 to 5:95.

19. The production method according to claim 1, wherein copolymerization of the macromonomer (I) with a polyfunctional compound having two or more polymerizable carbon—carbon double-bond-containing groups per molecule gives a cross-linked polymer.

20. The production method according to claim 19, wherein the polyfunctional compound having two or more polymerizable carbon—carbon double bond-containing groups per molecule is a polymer (III) terminally having two or more polymerizable carbon—carbon double-bond-containing groups per molecule.

21. The production method according to claim 1 wherein said step of polymerizing said macromonomer (I) is conducted in the manner of radical polymerization.

22. The production method according to claim 1 wherein said step of polymerizing said macromonomer (I) is conducted in the manner of living radical polymerization.

* * * * *